United States Patent [19]

Eckels

[11] Patent Number: 4,538,417

[45] Date of Patent: Sep. 3, 1985

[54] VAPOR TRAP FOR SUPERCOOLED ROTOR

[75] Inventor: Phillip W. Eckels, Penn Hills, Pa.

[73] Assignee: Electric Power Research Institute, Inc., Palo Alto, Calif.

[21] Appl. No.: 502,790

[22] Filed: Jun. 9, 1983

[51] Int. Cl.³ .............................................. F17C 7/02
[52] U.S. Cl. ........................................ 62/55; 62/499; 62/505; 165/178; 310/64
[58] Field of Search ............... 62/55, 499, 505; 165/189; 310/52, 54, 64

[56] References Cited

U.S. PATENT DOCUMENTS

| | | | |
|---|---|---|---|
| 3,760,603 | 9/1973 | Dicic | 62/505 |
| 4,048,529 | 9/1977 | Pomeroy et al. | 62/505 |
| 4,164,126 | 8/1979 | Laskaris | 62/505 |
| 4,194,137 | 3/1980 | Vinokurov et al. | 62/505 |
| 4,238,700 | 12/1980 | Vinokurov et al. | 62/505 |
| 4,309,632 | 1/1982 | Muller et al. | 62/505 |
| 4,329,849 | 5/1982 | Hofmann et al. | 65/505 |
| 4,368,397 | 1/1983 | Schnapper et al. | 310/52 |

*Primary Examiner*—Ronald C. Capossela
*Attorney, Agent, or Firm*—William D. Lanyi

[57] ABSTRACT

A vapor trap is placed in fluid communication with the vapor exhaust pipe of a supercooled rotor between, and in fluid communication with, the helium reservoir of the supercooled rotor and the portion of the exhaust pipe which is in contact with the torque tube of the rotor. By preventing a reverse flow of heated helium gas through the exhaust pipe toward the helium reservoir, the vapor trap of the present invention improves the operation of the rotor's vapor pump. Operating in a manner similar to liquid traps, the present invention blocks the passage of heated helium vapor in a reverse direction and thus improves the overall operation of the supercooled rotor.

4 Claims, 4 Drawing Figures

VAPOR TRAP FOR SUPERCOOLED ROTOR

BACKGROUND AND SUMMARY OF THE INVENTION

The present invention relates generally to the vapor exhaust system of a supercooled rotor and, more specifically, to a vapor exhaust system with a vapor trap associated in cooperation with a vapor pump within the central bore of a torque tube of a superconducting rotor.

In the supercooled rotor of a superconducting generator, superconducting field coils are immersed in a pool of liquid coolant, such as helium. As heat is removed from the superconducting field coils, the liquid coolant is caused to boil off at a generally constant rate. The resulting helium vapors are removed from the helium reservoir of the rotor through an exhaust pipe. The helium vapor passes through the exhaust pipe and is conducted out of the supercooled rotor to a refrigeration system where it is eventually condensed back into a liquid form for reintroduction into the supercooled rotor. A vapor pump, connected in fluid communication with the exhaust pipe, is utilized to encourage this flow of helium vapor away from the helium reservoir.

The vapor pump comprises a portion of the exhaust pipe which extends in a radial direction away from the central axis of the superconducting rotor. As the rotor revolves about this central axis, the helium vapor is caused to flow through the vapor pump by the resulting centrifugal forces acting on it. The efficiency of the vapor pump is a function of the density of the helium gas, the angular velocity of the vapor pump about the central axis of the rotor and the effective radial distance between the inlet and outlet portions of the vapor pump.

In typical applications, the vapor pump of a supercooled rotor, which comprises a section of the rotor's vapor exhaust pipe, is disposed between the helium reservoir and a portion of the exhaust pipe which is disposed in contact with a torque tube. This contact of the exhaust pipe and the torque tube allows the helium vapor to flow in thermal communication with the torque tube and to thus reduce the temperature of the torque tube and also reduce the heat which is being conducted toward the cold zone of the rotor. The portion of the exhaust pipe which is in contact with the torque tube is generally provided with a plurality of baffles which inhibit convection currents from forming within that portion of the exhaust pipe. These convection currents, if permitted to form, would reduce the efficiency of the vapor cooling of the torque tube and significantly increase the rate of heat flow through the torque tube.

Since the cold end of the torque tube is at a higher temperature than the helium vapor passing through the exhaust pipe, it is possible for the helium vapor to be warmed as it exits from the vapor pump and be induced to reverse its direction of flow within the exhaust pipe. Even though the gas experiences very high centrifugal forces which tend to cause it to flow in a radially outward direction, this warmed helium vapor could then possibly flow in a radially inward direction, past outwardly flowing colder helium, through the vapor pump and reenter the helium reservoir. If the diameter of the exhaust pipe is relatively small, this reverse flow of warmed gas is inhibited by the reluctance of the helium vapor to flow in two directions simultaneously through the vapor pump. This reluctance is caused by frictional forces and mixing between these two counter flowing streams of vapor. However, if the exhaust pipe is of significant diameter as may be required for rapid cool down procedures, separate streams of warm and cold helium vapor can flow in opposite directions through the vapor pump.

In a rotor which is rotating about its central axis, the temperature of a vapor can determine its direction of flow. Relatively cold vapor, due to its higher density, tends to flow in a radially outward direction, whereas warmer vapor, due to its lower density, tends to flow in a radially inward direction. Since thermal communication with the torque tube can significantly raise the temperature of helium vapor passing through the exhaust pipe, a potential reverse flow through the exhaust pipe can be created.

The torque tube is approximately 10°–20° Kelvin in the region where the exhaust pipe is in contact with it and the helium gas flowing in the normal direction through the exhaust pipe is slightly warmer than the liquid helium pool within the helium reservoir which is approximately 4° Kelvin. Therefore, the helium vapor can experience a temperature increase as it passes in thermal communication with the warmer torque tube in the region where the exhaust pipe and the torque tube are first in contact and in thermal communication with each other. The warmed helium vapor can then tend to flow in a radially inward direction through the vapor pump portion of the exhaust pipe.

If warmed helium vapor is permitted to flow in a reverse direction through the exhaust pipe of a supercooled rotor, the radially central portion of the helium reservoir can be eventually backfilled with unacceptably warm helium. When this condition exists, the helium reservoir contains liquid helium along its radially outward boundary with a cylindrically shaped quantity of warm helium vapor disposed about its central axis. Between the liquid helium and the warm helium vapor, a cylindrically shaped region of colder helium gas will exist. As more warm helium vapor enters the helium reservoir in a reverse direction through the exhaust pipe, this central cylinder of warm vapor increases in radius until the mouth of the exhaust pipe, which is in fluid communication with the helium reservoir, is completely covered with warm helium gas. When this condition occurs, only warm helium vapor is available to the inlet mouth of the exhaust pipe and the efficiency of the vapor pump is severely decreased and disadvantageous thermal oscillations can be created within the cooling circuit.

The present invention incorporates a generally U-shaped vapor trap within the exhaust pipe of a supercooled rotor. The vapor trap is disposed in fluid communication with the exhaust pipe between the helium reservoir and a portion of the exhaust pipe which is in contact with the torque tube. The vapor trap comprises a generally U-shaped section of pipe with two generally straight legs extending from the U-shaped section in a direction toward the central axis of the rotor. A first leg is disposed in a direction toward the portion of the exhaust pipe which is connected in direct fluid communication with the helium reservoir and a second leg is disposed in a direction generally toward the portion of the exhaust pipe which is in contact with the torque tube. The first leg which extends toward the helium reservoir is made longer than the second leg in order to improve the efficiency of the vapor trap and the operation of the vapor pump.

Since colder vapor tends to flow in a direction away from the central axis of a rotating member, the U-shaped portion of the present invention provides a collecting region for a volume of cold helium vapor within the radially outward portion of the vapor trap. If warmed helium vapor attempts to flow in a radially inward direction from the region of the exhaust pipe which is in contact with the torque tube, it will encounter this volume of colder helium gas within the vapor trap and thus the radially inward flow of warmed helium gas will be discouraged.

The present invention can comprise a U-shaped portion of the exhaust pipe itself or a separate component connected in fluid communication with the exhaust pipe between the helium reservoir and the portion of the exhaust pipe which is disposed in contact with the torque tube. By collecting a portion of relatively colder helium gas within the vapor trap, the flow of warmer helium gas in a reverse direction through the exhaust pipe is inhibited.

BRIEF DESCRIPTION OF THE DRAWINGS

The present invention will be more fully understood by a reading of the Description of the Preferred Embodiment in conjunction with the drawings, in which.

DESCRIPTION OF THE PREFERRED EMBODIMENT

The present invention relates generally to a supercooled rotor and, more particularly, to a vapor trap connected in fluid communication with a vapor exhaust pipe of a superconducting rotor.

Figure 1:
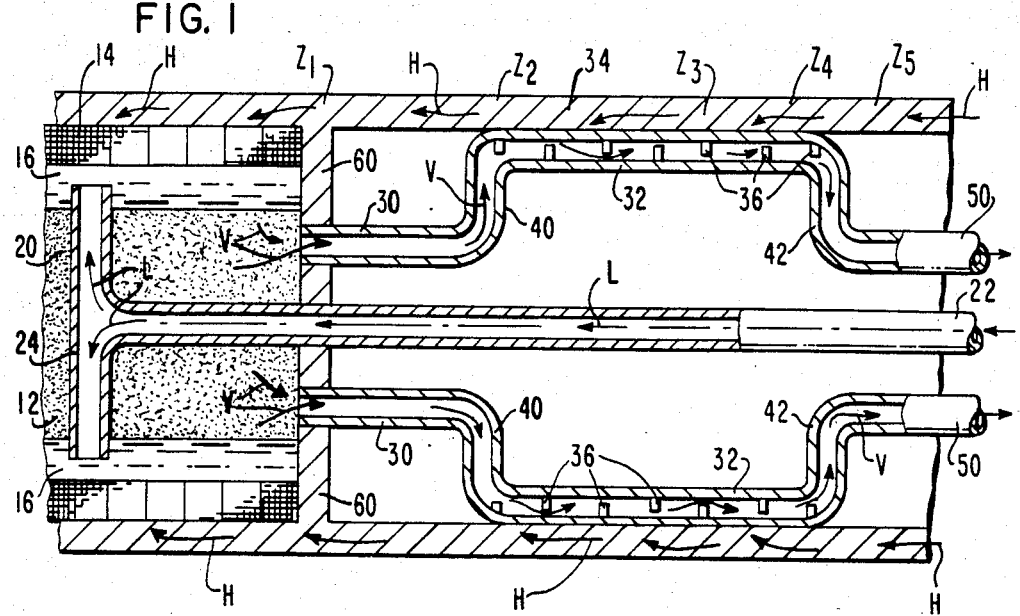
FIG. 1 represents a schematic illustration of a supercooled rotor.

In FIG. 1 a portion of a supercooled rotor is schematically illustrated. The supercooled rotor comprises a helium reservoir 12 in which a superconducting field winding 14 is disposed. The superconducting field winding 14 is immersed in a pool 16 of liquid helium. When the superconducting rotor revolves about its center line 18, the liquid helium forms a cylindrical pool 16 which is coaxial with the rotor's center line 18. As the liquid helium pool 16 cools the superconducting field winding 14, it boils off at a generally constant rate and forms a central core 20 of helium vapor which is disposed radially inward from the liquid helium pool 16.

Two-phase liquid helium is supplied to the helium pool 16 through a liquid helium inlet tube 22. The inboard end of the liquid inlet tube 22 can be typically formed into a T-shaped end portion 24 which acts as a liquid flow regulator for the liquid helium pool 16. The liquid helium flows in the directions indicated by arrows L, from an external source (not shown in FIG. 1), along the central axis of the rotor 18 through tube 22 and into the helium reservoir 12. Although the flow through the inlet tube 22 is indicated by arrows L, indicating a liquid, it should be understood that this fluid flow is two phase and constitutes both liquid and vapor helium. As the liquid helium pool 16 boils off, helium vapor passes, as indicated by arrows V, through one or more exhaust pipes 30. In FIG. 1, two exhaust pipes 30 are illustrated, but it should be understood that more than this number can be utilized in a superconducting rotor.

As can be seen in FIG. 1, the exhaust pipes 30 have a first portion 32 which is connected to the inner cylindrical surface of a vapor cooled torque tube 34. This first portion 32 of the exhaust pipes 30 aids in reducing the temperature of the torque tube 24. This first portion 32 of the exhaust pipes 30, which is connected in thermal communication with the torque tube 34, has a plurality of baffles 36 disposed within it. These baffles 36, which will be described in greater detail below, aid the function of the exhaust pipe by inhibiting the formation of convection currents or loops to form within its first portion 32. The exhaust pipes 30 have a radially outward extending portion 40 and a radially inward extending portion 42 on opposite sides of the first portion 32 which is in contact with the torque tube 34. As the relatively cold helium helium vapor flows from the helium reservoir 12 toward the first portion 32 of the exhaust pipe, it passes through the radially outward extending portion 40 of the exhaust pipe and, with the aid of centrifugal force, is encouraged to flow in the direction indicated by arrows V. After being warmed as it passes through the first portion 32 of the exhaust pipe, the helium vapor then flows in a radially inward direction through the radially inward extending portion 42 of the exhaust pipe 30. As discussed above, in a rotating supercooled rotor, colder gas has a greater tendency to flow radially outward, because of its higher density, than warmer gas. Therefore, it should be apparent to one skilled in the art of supercooled machines that the configuration illustrated in FIG. 1 will induce a helium vapor flow in the direction indicated by arrows V under normal conditions. After passing through the first portion 32 of the exhaust pipe 30, the helium vapor is routed toward segment 50 of the exhaust pipe 30 and, eventually, out of the supercooled rotor towards a refrigeration system (not illustrated in FIG. 1).

For illustrative purposes, five regions of the torque tube 34 have been labeled in FIG. 1 with reference characters $Z_1$-$Z_5$. These regions are at different temperatures due to the variation in their distances from the helium reservoir 12 and a driving means which is at room temperature. The driving means, which can be a turbine, is not illustrated in FIG. 1, but would drive the rotor through a suitable coupling at the right side of the figure.

Since the supercooled rotor illustrated in FIG. 1 must be connected to a driving means which is essentially at room temperature, a heat flow can be introduced into the torque tube 34 where the torque tube 34 is in contact with the driving means. In FIG. 1, this heat flow is indicated by arrows H. A portion of the heat flowing through the torque tube 34 is transferred to the first portion 32 of the exhaust pipes 30. Also, a portion of this heat flow passes into the axial closure 60 of the helium reservoir 12. The portion of this heat flow, as indicated by arrows H, which flows into the liquid helium pool 16 causes the liquid helium to boil off and form helium vapor 20 which then passes into and through the exhaust tubes 30. The preferred path of this heat flow is the one indicated by the circuit represented by arrows H and arrows V.

Figure 2:
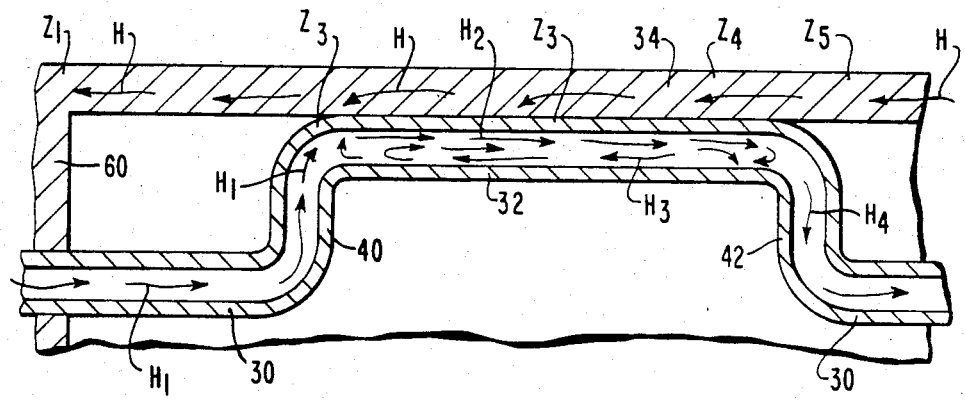
FIG. 2 illustrates potential convection currents set up within a portion of a vapor exhaust pipe of a supercooled rotor.

In order to illustrate the purpose of the baffles (reference numeral 36 in FIG. 1), the first portion 32 of an exhaust pipe 30 is illustrated in FIG. 2 without the presence of baffles within it. Arrows $H_1$ indicate the initial flow of relatively cold helium vapor through the exhaust pipe 30 in a radially outward direction through the radially outward extending segment 40 of the exhaust pipe 30. As this relatively cold helium vapor passes in fluid communication with the torque tube 34 it flows through the first portion 32 of the exhaust pipe 30 and the vapor's temperature is raised. As this helium vapor, as indicated by arrows $H_2$, is warmed by its thermal communication with the torque tube 34, it tends to migrate in a radially inward direction because of its lowered density. As this helium vapor is warmed and moves radially inward, it can begin to flow in a reverse direction, as indicated by arrows $H_3$, as compared to the flow of colder helium vapor indicated by arrows $H_2$. As the warmed helium vapor $H_3$ travels in a reverse direction through the first portion 32 of the exhaust pipe 30, its temperature can be reduced by thermal communication with the oppositely flowing stream $H_2$ of colder helium vapor and, once cooled, will tend to again move in a radially outward direction to rejoin the flow of helium vapor, as indicated by arrows $H_2$, in the normal direction. As this process is repeated over and over again, the convection currents, or loops, as indicated by arrows $H_2$ and $H_3$ in the first portion 32 of the exhaust pipe 30 can be formed with a resulting disruption of the normal flow of helium vapor through the exhaust pipe 30 which is indicated by arrows $H_4$ resulting in thermal short circuiting of the vapor cooled torque tube. As in FIG. 1, arrows H indicate the flow of heat through the torque tube 34. A portion of this heat flow passes into the first portion 32 of the exhaust 30, causing the flow of helium vapor $H_2$ to be warmed as described above.

The baffles (reference numeral 36 in FIG. 1) are disposed within the first portion 32 of the exhaust pipe 30 in order to discourage the formation of these disruptive convection currents. These baffles act as barriers within the pipe which create pockets of cold helium through which the warm helium cannot easily flow in a reverse direction. By disrupting the straight reverse path through the first portion 32 of the exhaust pipe 30, the baffles create a condition in which the pressures gradients between the ends of the exhaust pipe are the dominant force in determining the direction of the helium vapor flow and the resulting direction of flow is from the helium pool toward segment 50 of the exhaust pipe 30.

The behavior of the helium vapor gas illustrated in FIG. 2 not only demonstrates the purpose of the baffles (reference numeral 36 in FIG. 1), but also indicates the relative behavior of warm and cold helium vapors flowing in the same pipe. The present invention deals with a problem which arises because warmed helium vapor tends to move in a radially inward direction within a pipe which is conducting colder helium vapor in an opposite, radially outward, direction.

Due to the relative positions of the helium reservoir (reference numeral 12 in FIG. 1) and the external driving means which is connected to the torque tube 34, heat tends to flow in the direction indicated by arrows H in both FIGS. 1 and 2 as discussed above. It should be apparent to one skilled in the art that region $Z_1$ is therefore significantly colder than region $Z_5$ with regions $Z_2$–$Z_4$ representing a temperature gradient therebetween. Each of the regions, $Z_1$–$Z_5$, in FIGS. 1 and 2 represent progressively warmer regions as they progress from left to right with region $Z_2$ being warmer than region $Z_1$, region $Z_3$ being warmer than $Z_2$, and so on.

Figure 3:
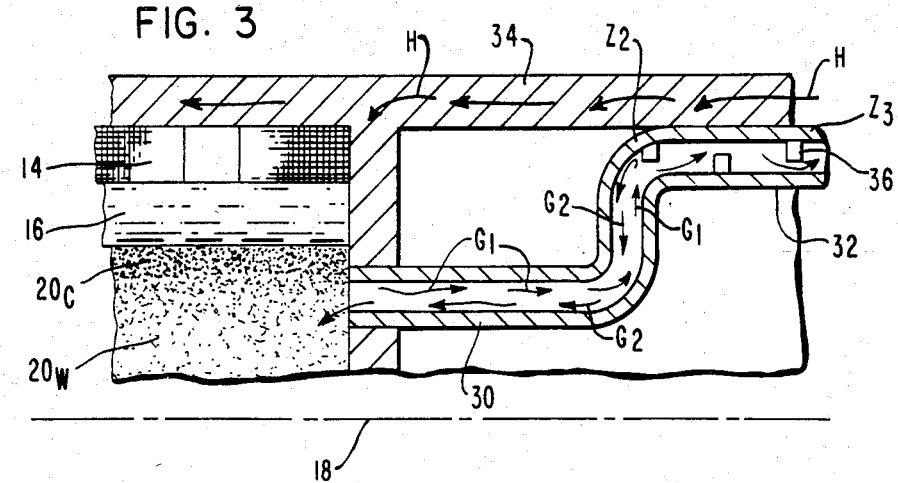
FIG. 3 schematically illustrates a vapor pump of a supercooled rotor with reverse vapor flows therein.

FIG. 3 illustrates a potential problem which could occur in a vapor pump of a supercooled rotor. The helium reservoir is shown with the field windings 14 being immersed in a liquid helium pool 16. Connected in fluid communication with the helium reservoir is an exhaust pipe 30 which has a first portion 32 disposed in contact with the torque tube 34 and a radially outward extending portion 40 which acts as a vapor pump. As cold helium vapor enters the exhaust pipe 30, it begins its flow toward and through the radially outward extending portion 40 as indicated by arrows $G_1$. In normal operation, centrifugal forces act on the cold helium vapor and cause it to flow radially outward through the radially outward extending portion 40 and it then flows through the baffles 36 in the first portion 32 of the exhaust pipe toward an exhaust region of the exhaust pipe 30 where it exits from the rotor. However, since the torque tube 34 is at a higher temperature than the helium vapor flowing as indicated by arrows $G_1$, a portion of this vapor can be heated by the torque tube in region $Z_2$ and its temperature can be increased. When this portion of the helium vapor is heated, its tendency is to move in a radially inward direction, indicated by arrows $G_2$, and pass in a reverse direction through the exhaust pipe 30 as illustrated. The heated helium vapor passes in a reverse direction through the exhaust pipe 30 into the helium reservoir as illustrated by arrows $G_2$ and effectively transfers heat through the exhaust pipe 30 in a direction from region $Z_2$ directly into the helium reservoir. This heat transport creates a heat transfer path between the torque tube 34 and the liquid helium pool 16 other than the preferred more efficient path which is indicated by arrows H.

As warmed helium enters the helium reservoir from the exhaust pipe 30, it forms a central core $20_w$ of warm helium vapor within the helium reservoir. Due to its increased temperature and decreased density, this warm helium vapor $20_w$ forms a cylindrical volume coaxially disposed about the central axis 18 of the rotor. Between the warm helium cylinder $20_w$ and the liquid helium pool 16, the remaining cold helium vapor $20_c$ is disposed in a generally cylindrical space which is coaxial about the central axis 18 of the rotor. As the volume of the warm helium vapor $20_w$ increases, it expands in a radial direction from the central axis 18 and, eventually, encompasses the mouth 61 of the exhaust pipe 30 where it provides fluid communication with the helium reservoir. When this occurs, the helium gas entering the mount 61 of the exhaust pipe 30 comprises only warm helium vapor and the vapor pump operation is severely disturbed. The vapor pump, which comprises the radially outward extending portion 40 of the exhaust pipe 30, then acts essentially as a radial thermosyphon and the proper operation of this vapor pump is severely hampered.

The primary objective of the present invention is to reduce the tendency of the helium vapor to pass in a radially inward direction from the first portion 32 of the exhaust pipe 30 in such a way so as to form dual vapor paths, $G_1$ and $G_2$, within the vapor pump.

Figure 4:
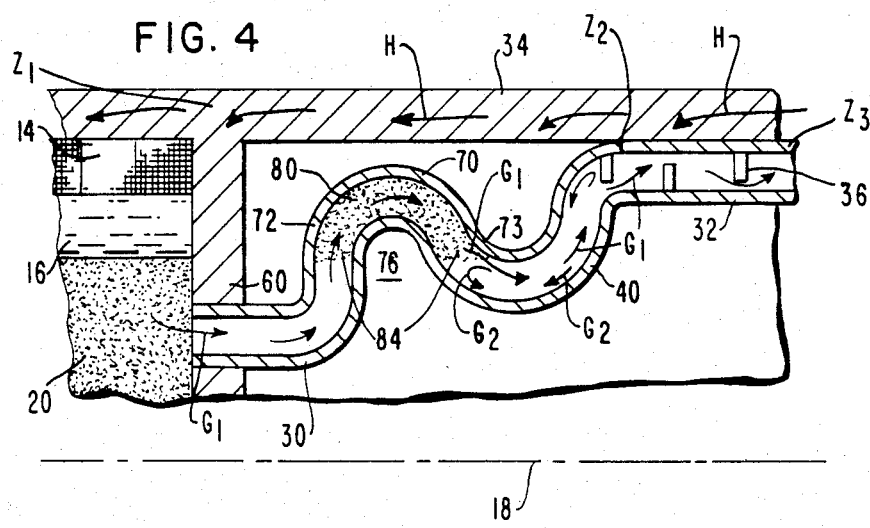
FIG. 4 illustrates the present invention disposed in fluid communication with the vapor exhaust pipe of a supercooled rotor.

The present invention is illustrated in FIG. 4 being disposed between the helium reservoir and the first portion 32 of the exhaust pipe 30. As illustrated in FIGS. 1–3, the first portion 32 of the exhaust pipe 30 which is illustrated in FIG. 4, is disposed in contact with the torque tube 34. Within this first portion 32, a plurality of baffles 36 are disposed in order to prevent the convection currents, which are discussed above in conjunction with FIG. 2, from forming. As heat, indicated by arrows H, passes axially inward toward the helium pool 16, the helium boils off at a generally constant rate and forms helium vapor 20. The helium vapor flows into the exhaust pipe 30, as indicated by arrows $G_1$, and toward the first portion 32 of the exhaust pipe 30.

The present invention is disposed in fluid communication with the exhaust pipe 30 between the helium reservoir and the first portion 32 of the exhaust pipe 30. As illustrated in FIG. 4, the present invention comprises a generally U-shaped pipe 70 which has first 72 and second 73 generally straight legs. The legs, 72 and 73, extend in a radially inward direction to form a generally U-shaped vapor trap 76. The first leg 72 is disposed in a direction toward the helium reservoir and the second leg 73 is disposed in a direction toward the first portion 32 of the exhaust pipe 30. As can be seen in FIG. 4, this results in the short leg 73 being the downstream leg of the vapor trap 76 and the first leg 72 being the upstream leg of the vapor trap 76. When the supercooled rotor revolves about its centerline 18, centrifugal force causes the relatively dense cooler helium vapor 80 to settle within the U-shaped portion 70 of the vapor trap 76. As in any fluid trap, the predominant force, which in this case is centrifugal, causes the denser fluid to settle within the trap, preventing less dense fluids from passing therethrough. Therefore, the cooler helium vapor as represented by arrows $G_1$ can pass into and through the vapor trap 76 toward the first portion 32 of the exhaust pipe 30. However, when a portion of that vapor is heated, such as at region $Z_2$ by its thermal communication with the torque tube 34, the tendency for that warmer helium vapor to flow in the direction indicated by arrows $G_2$ is inhibited. In practice, the warmer helium vapor, when attempting to flow in a reverse direction through the exhaust pipe 30, encounters an interface 84 between the colder 80 and warmer helium vapors and its tendency to pass in a reverse direction through the vapor trap 76 is reduced.

The present invention operates similarly to that of a liquid trap in order to prevent the reverse flow of heated helium vapor therethrough. It comprises a generally U-shaped pipe placed in fluid communication with the exhaust pipe of a supercooled rotor. The vapor trap is in fluid communication with the helium reservoir and the first portion of the exhaust pipe which is in contact with a torque tube. Its presence between the helium reservoir and this first portion of the exhaust pipe which is in thermal communication with the torque tube improves the operation of the supercooled rotor's vapor pump by preventing reverse flow of heated helium vapors through the exhaust pipe toward the helium reservoir.

Although the present invention has been described in considerable detail, it should be understood that alternative embodiments are within its scope. It should further be understood that the present invention provides a means for improving the operation of a vapor pump within a supercooled rotor by preventing reverse flow through the exhaust pipe of the rotor of a superconducting generator.

What I claim is:

1. A supercooled rotor, comprising:
   a coolant reservoir;
   a torque tube;
   an exhaust pipe connected in fluid communication with said coolant reservoir, said exhaust pipe being disposed within a central bore of said torque tube, a first portion of said exhaust pipe being disposed in contact with said torque tube, said first portion of said exhaust pipe having a plurality of baffles disposed therein;
   a vapor trap disposed in fluid communication with said exhaust pipe between said reservoir and said first portion of said exhaust pipe, said vapor trap being in fluid communication with said reservoir and said first portion of said exhaust pipe; and
   means for thermally insulating said vapor trap from said torque tube.

2. The supercooled rotor of claim 1, wherein:
   said vapor trap comprises a generally U-shaped segment of pipe having first and second generally straight legs, said first leg being disposed proximate said reservoir and said second leg being proximate said first portion of said exhaust pipe.

3. The supercooled rotor of claim 2, wherein:
   said first leg is longer than said second leg.

4. The supercooled rotor of claim 1, wherein:
   said coolant is helium.

\* \* \* \* \*